United States Patent

[11] 3,629,712

[72] Inventor James M. Clark
Cedar Grove, N.J.
[21] Appl. No. 66,324
[22] Filed Aug. 24, 1970
[45] Patented Dec. 21, 1971
[73] Assignee International Telephone and Telegraph Corporation
Nutley, N.J.

[54] PHASE COMPARATOR
6 Claims, 11 Drawing Figs.

[52] U.S. Cl. .......... 328/109, 307/232, 328/133
[51] Int. Cl. .......... H03k 5/20
[50] Field of Search .......... 307/232; 328/109–111, 133, 155

[56] References Cited
UNITED STATES PATENTS

| | | | |
|---|---|---|---|
| 3,302,197 | 1/1967 | Humphery's | 328/109 |
| 3,408,581 | 10/1968 | Wakamoto et al. | 328/109 |
| 3,418,586 | 12/1968 | Asher | 328/109 |
| 3,519,841 | 7/1970 | Leinfelder | 328/109 |

*Primary Examiner*—Donald D. Forrer
*Assistant Examiner*—R. E. Hart
*Attorneys*—C. Cornell Remsen, Jr., Walter J. Baum, Paul W. Hemminger, Percy P. Lantzy, Philip M. Bolton, Isidore Togut and Charles L. Johnson, Jr.

ABSTRACT: An improved phase comparator for a phase-locked loop to extract the bit clock from binary data bits by detecting both the positive and negative transitions of the data bits. An equal number of the positive and negative transitions, statistically, are sampled and a transition (either positive or negative) is inhibited by cooperation of an additional bistable device controlled by a monostable device, if this transition occurs within one bit period after a previously sampled transition (either positive or negative). This technique compensates for the asymmetrical phase noise characteristic present due to transition jitter when only one transition of the data bits are detected and prevents an attempt at 100 percent duty cycle operation of the monostable device when both transitions of the data bits are detected.

INVENTOR
JAMES M. CLARK
BY Alfred C. Hill
AGENT

INVENTOR
JAMES M. CLARK
BY Alfred C. Hill
AGENT

INVENTOR
JAMES M. CLARK
BY Alfred C. Hill
AGENT

INVENTOR
JAMES M. CLARK
BY Alfred C. Hill
AGENT

INVENTOR
JAMES M. CLARK
BY Alfred C. Hill
AGENT

PHASE COMPARATOR

BACKGROUND OF THE INVENTION

This invention relates to a bit synchronization system of the phase-locked loop-type applicable to pulse code modulation (PCM) systems and more particularly to an improved phase comparator for employment therein.

Phase-locked loop-type bit synchronization systems enabling the extraction of bit information from the received code signal and the adjustment of a local bit clock to cause synchronization has, in the past, employed a phase comparator to which the received code signal and local bit clock are coupled for phase comparison. These phase comparators of the prior art generated directly an analog control signal which then was applied to a low-pass filter for limiting the bandwidth of the phase-locked loop for control of a voltage controlled oscillator located in the bit clock source to cause synchronization of the bit clock to the received bits of the coded signal. In the usual low-pass filter there is a single time constant present which is made long to protect against code signal fading which increased the tim of acquisition of synchronization. However, on the other hand, if the time constant was adjusted for rapid acquisition there was no protection against fading of the code signal which would result in a loss o synchronization, since the control signal would disappear from the control point of the voltage controlled oscillator.

In the copending application of S. J. DeMaio et al. Ser. no. 739,737, filed June 25, 1968, there is described therein a bit synchronization system of the phase-locked loop-type employing a phase detector that produces a digital signal indicating the phase relationship between the code signal and the local bit clock, the digital signal being in the form of a pulse width modulated signal. This digital signal then was coupled to an integrator to produce the analog control signal for the voltage controlled oscillator of the local bit clock source. The integrator included therein between the two signals and a second time constant which maintained the value of the controlled signal during long fades of the received code signal, such as experience in tropospheric scatter, satellite and the like communication systems, so that the oscillator tended to remain at the frequency dictated by the control signal prior to the fading of the code signal below an acceptable signal threshold.

The phase comparator of the above-mentioned copending application operated upon only positive date transitions which could result in asymmetrical phase noise which unbalanced the phase-locked loop. For instance, when the noise distribution was skewed in one direction the positive response of the phase-locked loop was decreased more than the negative response and when the noise distribution was skewed in the other direction the response was opposite.

SUMMARY OF THE INVENTION

An object of the present invention is to provide an improved phase comparator for employment in a phase-locked loop-type of bit synchronization systems.

Another object of this invention is to provide a phase comparator for utilization in a phase-locked loop-type bit synchronization system which compensates for asymmetrical phase noise characteristics.

A further object of this invention is to provide a phase comparator for utilization in a phase-locked loop-type bit synchronization system which operates upon both the positive and negative transitions of the date bits of the received code signal.

Still a further object of this invention is to provide a phase comparator for a phase-locked loop-type bit synchronization system which employs the circuitry of the above-identified copending application and adds thereto an additional bistable device, under control of the monostable multivibrator, and bit clock, and logic circuitry coupled thereto to delete transitions that occur within a time period equal to the bit period of the received code signal after a previously sampled transition.

A feature of this invention is the provision of a system to generate an output signal indicative of the phase relationship of a first pulse signal and a second pulse signal, each pulse of the first pulse signal having a width equal to an integral multiple of a predetermined width, wherein the integral includes one, and each pulse of the second pulse signal having a width less than one-half the predetermined width and a repetition period equal to the predetermined width, comprising: a first source of the first pulse signal; first means coupled to the first source to produce a third pulse signal including a pulse having a width less than one-half the predetermined width corresponding to each transition of each of the pulses of the first pulse signal; a second source of the second pulse signal; second means coupled to the first means and the second source to produce a forth pulse signal having adjacent pulses therein separated by an amount greater than the predetermined width; and third means coupled to the second means and the second source to produce the output signal.

Another feature of this invention is the provision of a system as outlined immediately above wherein the first signal is a binary intelligence signal having a bit period equal to the predetermined width; and the second signal is produced to indicate a given one of the transitions of a local bit clock which is to be synchronized with the bits of the binary intelligence signal.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

Figure 1:
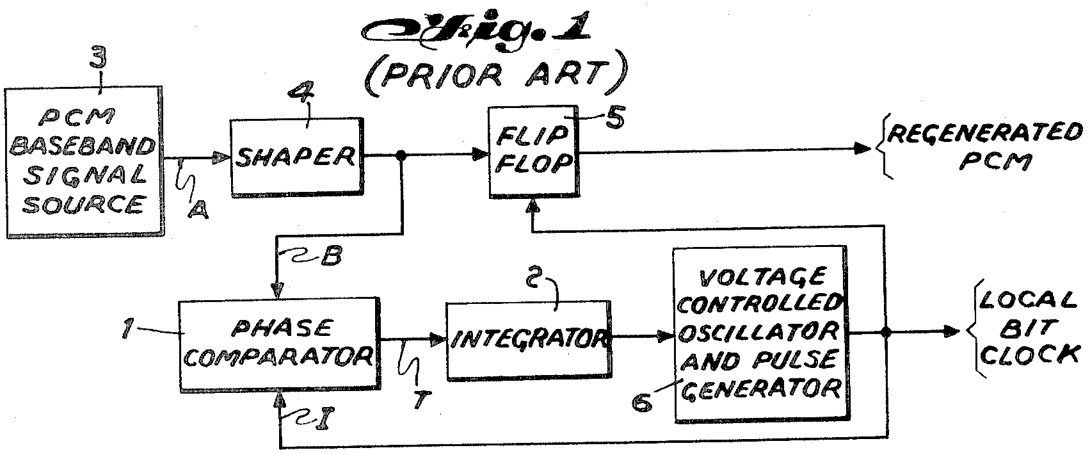
FIG. 1 (PRIOR ART)
FIG. 1 is a general block diagram of a phase-locked loop-type bit synchronization system in which the phase comparator of the present invention will be employed.
Figure 8:
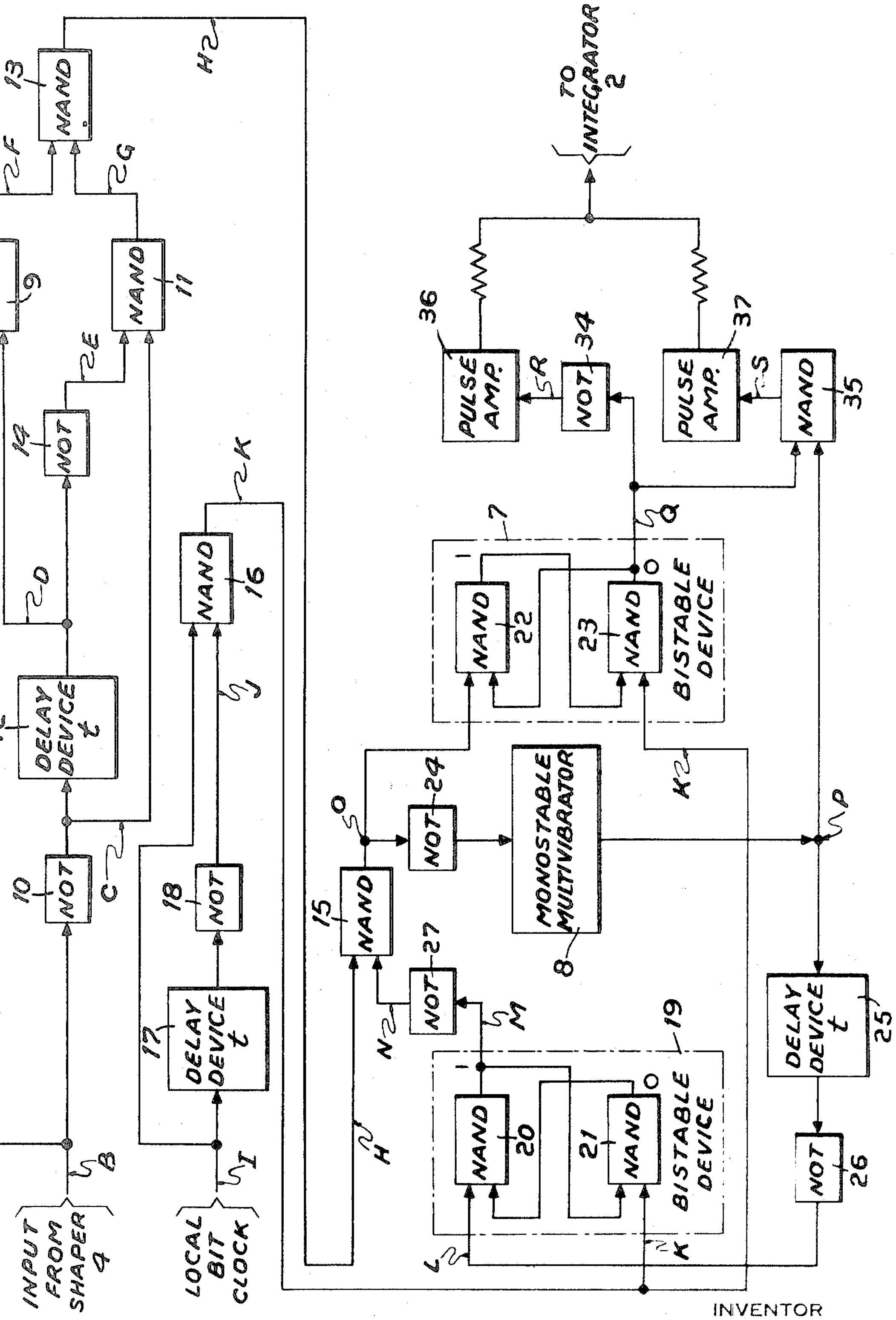
FIG. 8 is a block diagram illustrating the phase comparator in accordance with the principles of the present invention.
Figure 9:
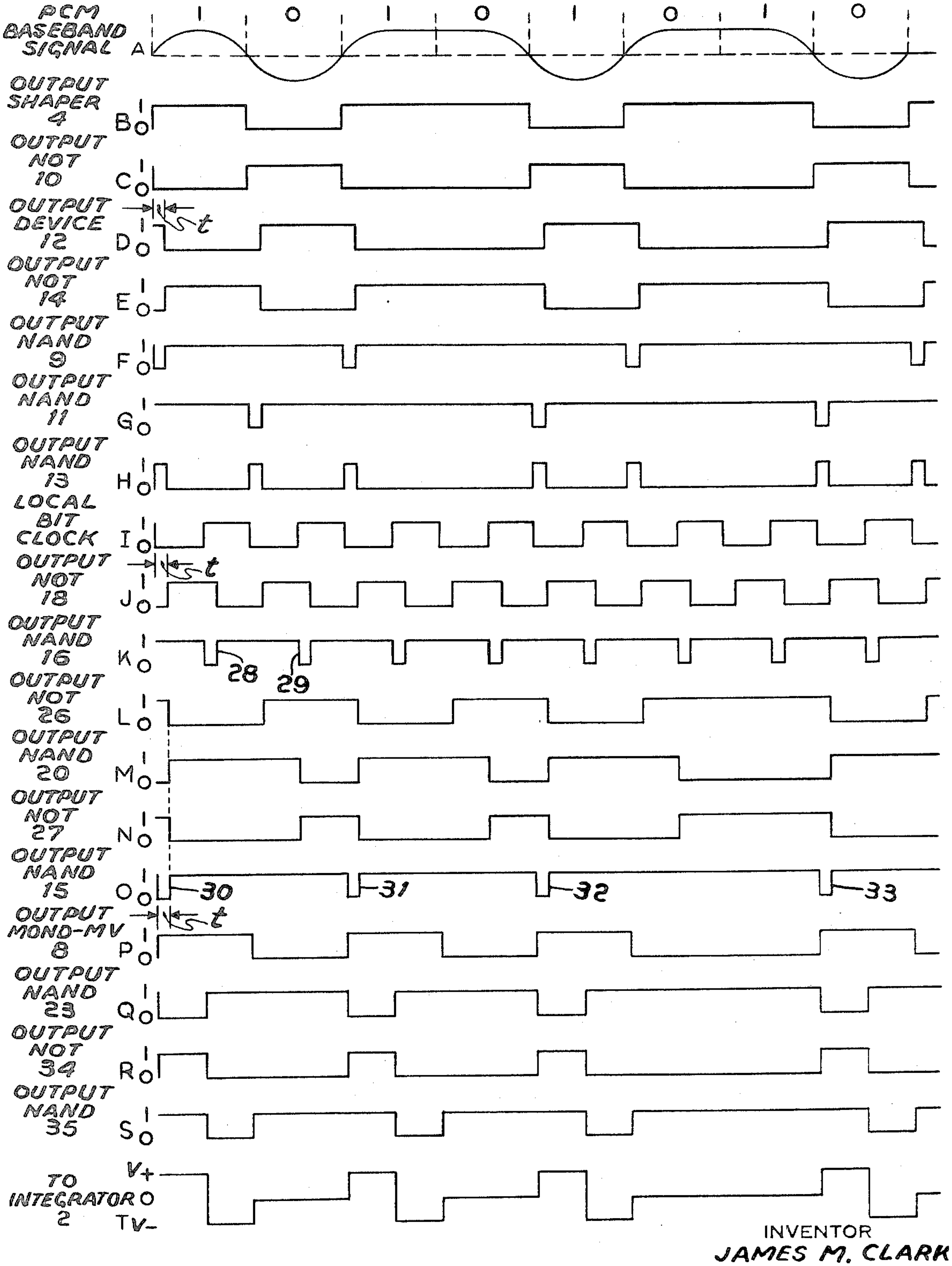
FIGS. 9, 10 and 11 illustrate typical timing diagrams for inphase, leading and lagging conditions of the bit clock relative to the received code signal, respectively, useful in explaining the operation of the phase comparator of FIG. 8.
Figure 10:
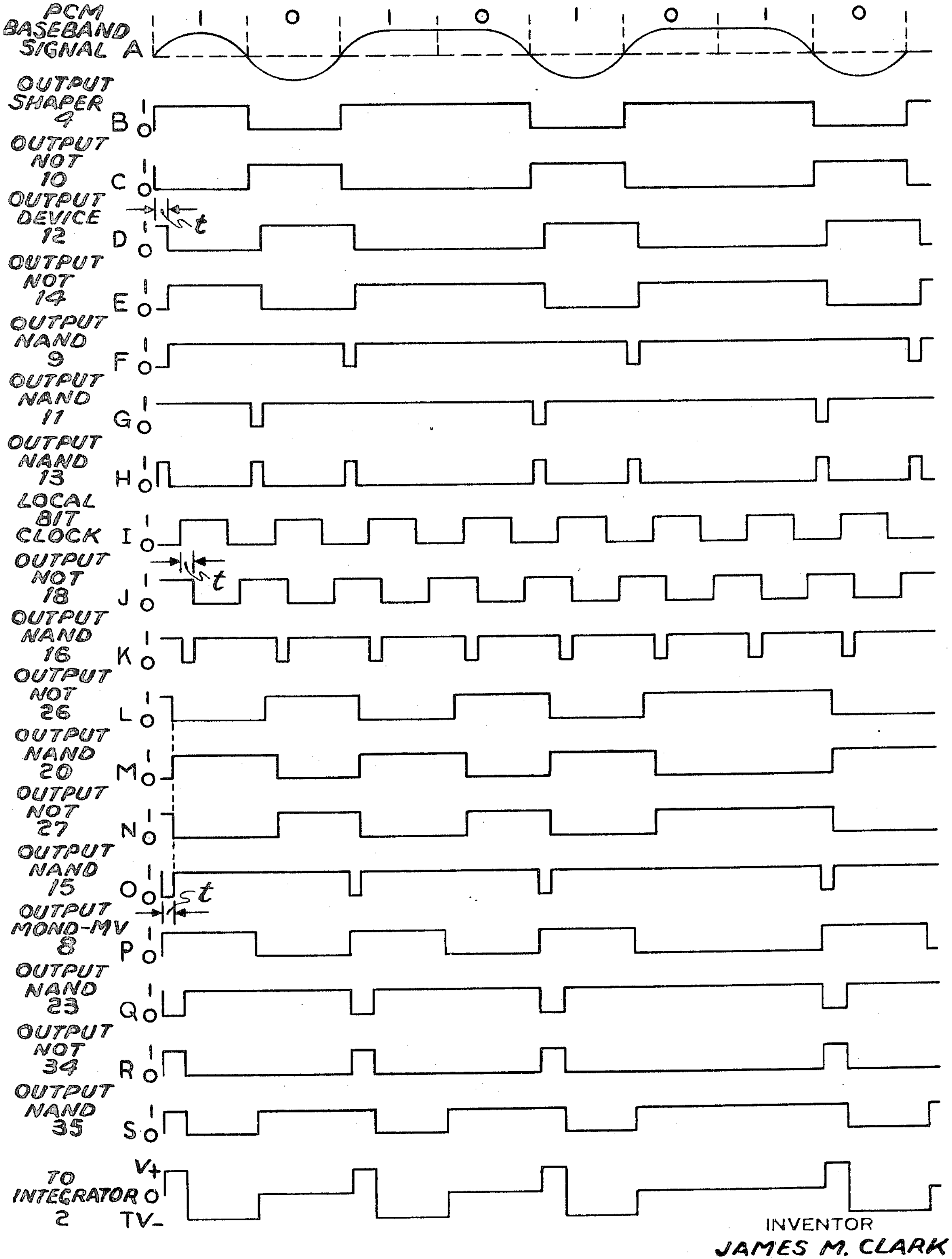
Figure 11:
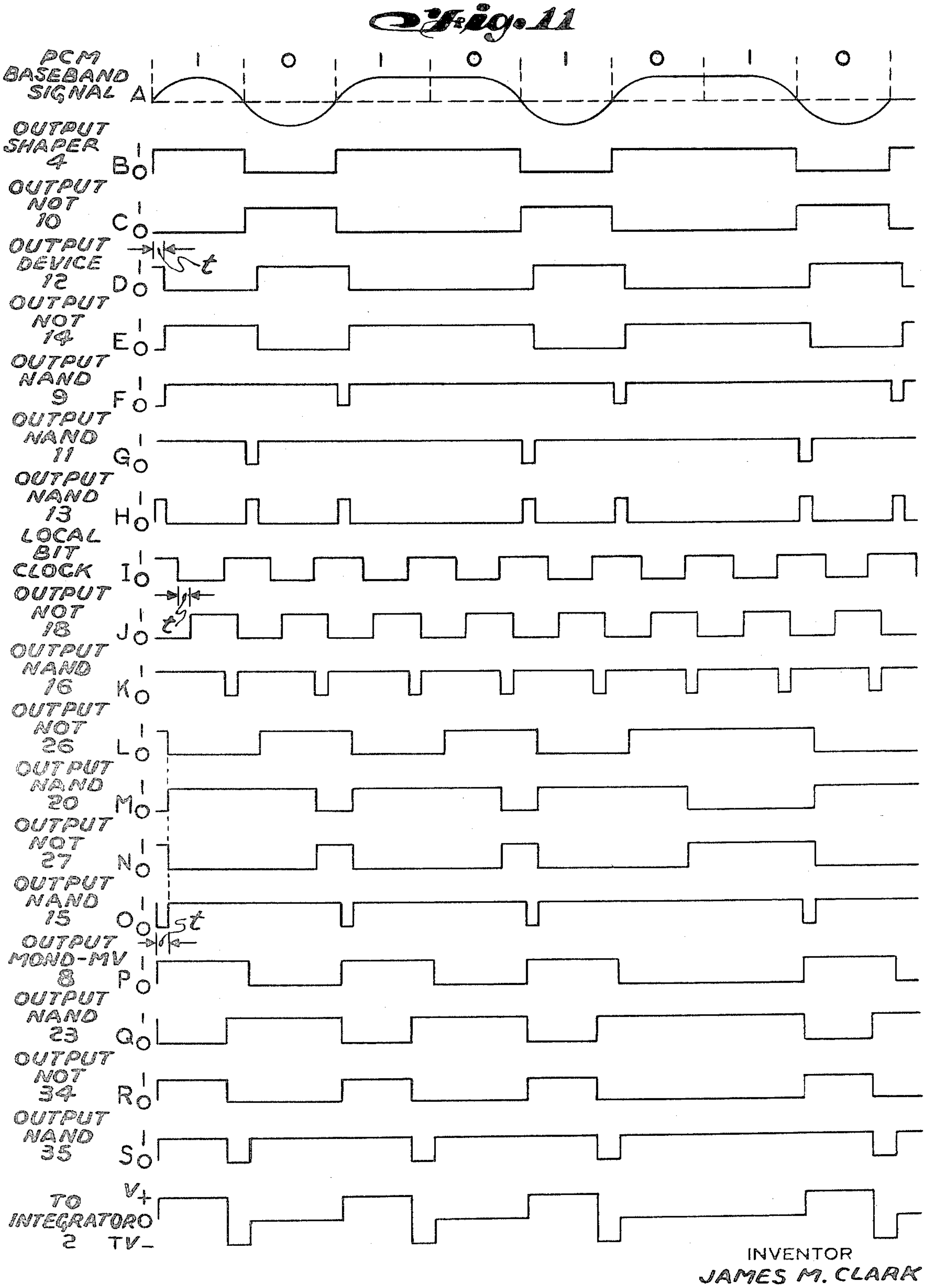

It should be noted that the letter references in FIGS. 1 and 8 correspond to the letters of the curves of FIGS. 9, 10 and 11.

Referring to FIG. 1, there is illustrated therein a general block diagram of a known phase-locked loop-type bit synchronization system incorporating therein phase comparator 1 in accordance with the present invention which in conjunction with integrator 2 provides the desired control signal to assure that the local bit clock is in synchronism with the bits of the received PCM signal. The distorted PCM baseband signal (curve A, FIGS. 9, 10 and 11) is applied from source 3 to shaper 4 to amplitude regenerate the distorted PCM signal, that is, to render the PCM baseband signal with positive and negative going transitions which are substantially vertical rather than sloped as in the distorted PCM baseband signal. Shaper 4, for example, may include a clamp circuit and a center slicer circuit. The reshaped PCM signal at the output of shaper 4 (curve B, FIGS. 9, 10 and 11) is then coupled to flip flop 5 for time regeneration under control of the locally generated bit clock. The output of flip flop 5 is regenerated PCM properly timed provided the local bit clock is in synchronism with the bits of the received PCM baseband signal.

The local bit clock generator may, for example, include a voltage controlled oscillator (VCO) and pulse generator 6.

The local bit clock is synchronized to the bits of the received PCM signal by applying the output of shaper 4 and the output of generator 6 to phase comparator 1 which is digital in nature as will be described hereinbelow with reference to FIG. 8. Comparator 1 produces at its output a given constant amplitude positive pulse and a negative pulse having the given constant amplitude. These two pulses are referenced to a common reference level, such as ground, with the width thereof varying in opposite directions depending upon the phase relationship between the bit clock and the bits of the received PCM signal. This signal is illustrated in curve T, FIGS. 9, 10 and 11 and is applied to the integrator 2 in integrate the areas of the positive and negative pulses to produce the control signal which will be employed to control the VCO of generator 6 to establish the desired synchronization. Integrator 2 may have a single time constant as mentioned hereinabove under the heading "Background of the Invention." Preferably, however, integrator 2 is of the type described in the above-cited copending application having two different time constants to enable rapid acquisition of synchronization and protection against long fades of the received signal, particularly, when utilized in long distance communication systems, such as tropospheric scatter and satellite communication systems.

Figure 2:
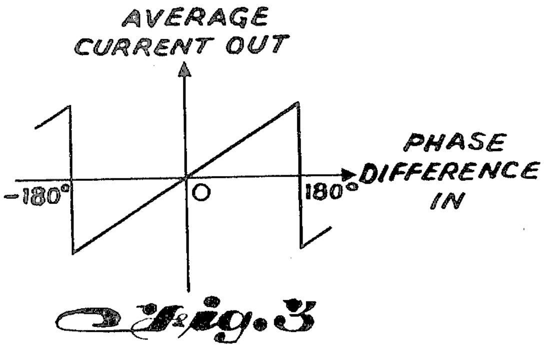
FIGS. 2–7 are curves illustrating the problem encountered in phase-locked loop-type synchronization systems when employing a phase comparator as disclosed in the above identified copending application and which will be compensated for in accordance with the principles of operation of the phase comparator of the present invention.
Figure 3:
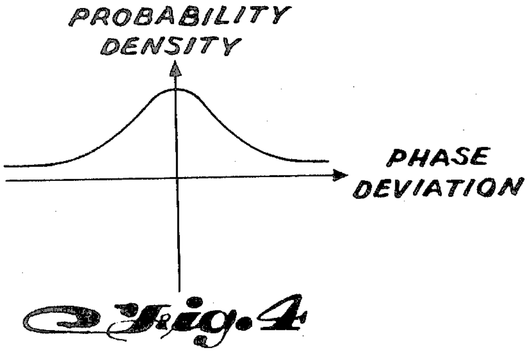
Figure 4:
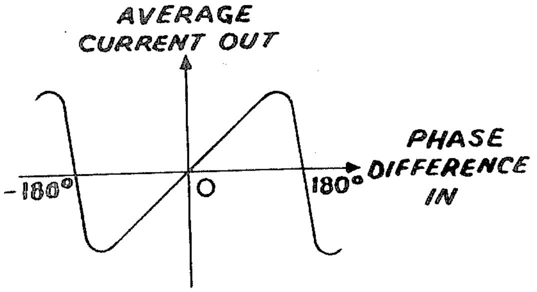
Figure 5:
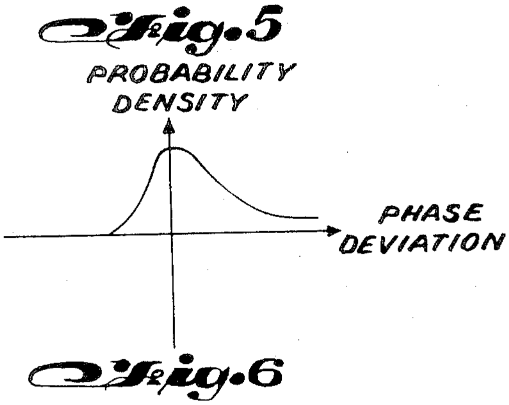
Figure 6:
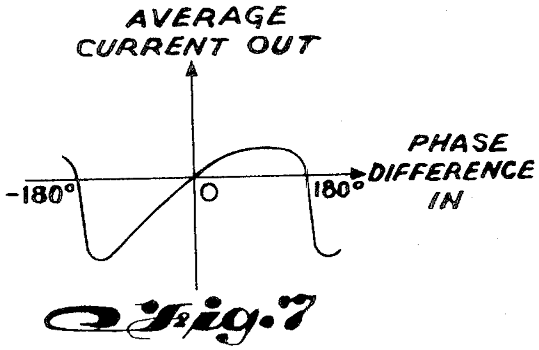
Figure 7:
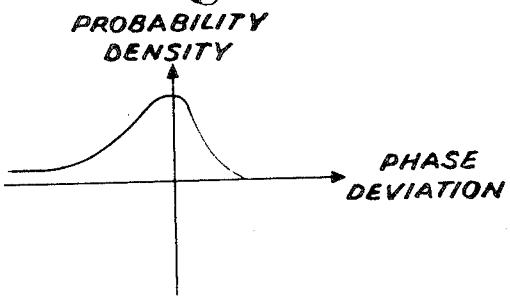

As pointed out hereinabove the phase comparator of the above-cited copending application employed only the positive date transitions and it has been found that when using such an arrangement and the phase noise resulting from jitter of the date transition is asymmetric and the phase locked loop becomes unbalanced. With no noise, the response of the phase comparator is as illustrated in FIG. 2. With symmetrical noise as illustrated in FIG. 3, the response of the phase comparator is as illustrated in FIG. 4, which is also symmetrical. If, however, the noise is asymmetrical as illustrated in FIG. 5, the response of the phase comparator of the above cited copending application is as illustrated in FIG. 6, that is, the positive response is decreased more than the negative response. If the noise distribution is skewed in the other direction as illustrated in FIG. 7, the resultant response of the phase comparator is opposite to that illustrated in FIG. 6, namely, the negative response is decreased more than the positive response.

The source of asymmetry of the probability distribution of the phase noise (transition jitter) is due to a dependence of signal/noise ratio on instantaneous signal amplitude often seem experimentally, and apparently related to radio alignment and response near and at signal threshold. As a result, there may, for example, be more amplitude noise on "1" bits than "0" bits. In this case, the phase noise distribution on negative transitions is as illustrated in FIG. 7 and for positive transitions as illustrated in FIG. 5.

The basic idea of the present invention is to balance the response of the phase comparator by sampling an equal number of positive and negative transitions. However, one of the pulse-generating circuits of the phase comparator employed in the above-cited copending application which is also employed in the phase comparator of the present invention, namely, monostable multivibrator 8, cannot be triggered more than once every two bit periods. This is because the monostable multivibrator cannot operate at 100 percent duty cycle at typical bit rates. In the circuit of the phase comparator of the cited copending application, this is satisfied because only positive transitions triggered the monostable multivibrator and two positive transitions cannot occur in any tow bit intervals. However, if the requirement for the phase comparator is changed so that the multivibrator is triggered on positive and negative transitions, it is possible to have two transitions in a two bit interval and, thus an attempt at 100 percent duty cycle operation.

In accordance with the teachings of the present invention, the problem of attempting 100 percent duty cycle operation can be circumvented by inhibiting the sampling of a transition if it follows "immediately" (by one bit period later) after a transition previously sampled. The circuit arrangement for carrying out the objects of this invention is illustrated in FIG. 8.

Referring to FIG. 8, the input from shaper 4 (curve B, FIGS. 9, 10 and 11) is coupled directly to NAND-gate 9 and also to NOT-circuit 10. The output from NOT 10 (curve C, FIGS. 9, 10 and 11) is coupled to NAND-gate 11 and to delay device 12 having a delay equal to *t*. The output from delay device 12 (curve D, FIGs. 9, 10 and 11) is coupled to NAND 9 resulting in an output therefrom as illustrated in curve F, FIGS. 9, 10 and 11. This signal is applied to NAND 13. The output from delay device 12 is also applied to NOT circuit 14 resulting in an output therefrom as illustrated in curve E, FIGS. 9, 10 and 11. This output is coupled to NAND 11 resulting in an output therefrom as illustrated in curve G, FIGS. 9, 10 and 11 for application to NAND 13. The output from NAND 13 is illustrated in curve H, FIG. 9, 10 and 11 and is coupled to NAND-gate 15.

Assuming for a moment that the local bit clock (curve I, FIG. 9) is in synchronism with the bits of the received PCM signal, that is, the positive transition of the local bit clock occurs exactly in the center of a bit period of the received PCM signal, the remainder of the circuit will now be described. The local bit clock is coupled directly to NAND-gate 16 and to delay device 17 having a time delay equal to *t*. The output of delay device 17 is coupled to NOT-circuit 18 producing an output (curve J, FIG. 9) which is coupled to NAND 16. The output of NAND 16 (curve K, FIG. 9) is coupled as the reset signal for bistable device 19 and bistable device 7. Bistable device 19, may, for example, include NAND-gates 20 and 21 interconnected as illustrated while bistable device 7, may, for example, include NAND-gates 22 and 23 interconnected as illustrated. The set input (curve L, FIG. 9) for bistable device 19 is generated by NOT-circuit 24 coupled to the output of NAND 15, monostable multivibrator 8 coupled to the output of NOT 24, delay device 25 having a delay time equal to *t* coupled to the output of multivibrator 8 and NOT circuit 26 coupled to the output of delay device 25. The "1" output of bistable device 19 (the output of NAND 20) is coupled through NOT circuit 27 to NAND 15. Assuming that the 1 output (curve M, FIG. 9) is in the 0 state NAND 15 through NOT 27 (curve N, FIG. 9) permits the passage of a pulse to the output of NAND 15 as illustrated by curve 0, FIG 9. The 1 to 0 transition of curve 0, FIG. 9 is applied through NOT 24 to trigger multivibrator 8 which generates the signal as illustrated in curve P, FIG. 9 having a pulse duration equal to a single bit period of the received PCM signal. When this signal is applied through delay device 25 and NOT 26 there results the set signal (curve L, FIG. 9) for bistable device 19. Although delay device 25 has been shown as a lumped delay this could just as well be a distributed delay present in the NAND circuits of bistable device 19, NAND 15 and multivibrator 8. The delay has been shown as a lumped delay only for convenience. Thus, the additional bistable device 19 is set by the 1 to 0 transition of the signal illustrated in curve L, FIG. 9 and is reset by the appropriate one of the 1 to 0 transition of the signal illustrated by curve K, FIG 9. When the 1 output of bistable device 19 is used, as illustrated, to operate upon NAND 15 through NOT 27, the signal represented by curve L, FIG. 9 has priority over the signal illustrated by curve K, FIG. 9, if there is both a set and reset attempt simultaneously. For instance, when a reset pulse, such as pulse 28 (curve K, FIG. 9), attempts to reset bistable device 19, which is in the 1 state, the 0 output will produce a 1 condition which when coupled to NAND 20 along with a 0 condition for the set signal there will result a 1 and 0 1 output of bistable device 19. Thus, momentarily, both the 1 and 0 outputs of the bistable device 19 will be in the 1 condition, but will have no effect since the set signal has priority over the reset signal and will return to the set condition when the short duration pulse 28 disappears. When the set signal is in the 1 condition and the reset signal is in the 0 condition, as illustrated by pulse 29 (curve K, FIG. 9) bistable device 19 will be reset as illustrated in curve M, FIG. 9.

The resultant output of NOT 27 (curve N, FIG. 9) acts to inhibit pulses within one bit period of the immediately preceding pulse that was passed through NAND 15. Thus, the output of NAND 15 will be as illustrated in curve 0, FIG. 9, wherein adjacent pulses are separated by an amount greater than one bit period with some of the pulses being derived from the positive transitions of the received PCM signal, such as illustrated by pulses 30 and 31 of curve 0, FIG. 9, while others of the pulses will be derived from the negative transitions of the received PCM signal, such as illustrated by pulses 32 and 33 of curve 0, FIG. 9.

The output from NAND 15 is coupled to the set input of bistable device 7 which cooperates with the reset signal applied to bistable device 7 to produce the output signal on the 0 output of bistable device 7 as illustrated in curve Q, FIG. 9. This output is applied to NOT circuit 34 resulting in an output as illustrated in curve R, FIG. 9. The 0 output of bistable device 7 is also coupled to NAND-gate 35 which receives its other input from monostable multivibrator 8 and produces an output signal as illustrated in curve 3, FIG. 9. The outputs from NOT 34 and NAND 35 are coupled to pulse amplifiers 36 and 37, respectively, and combined to provide the output as illustrated in curve T, FIG. 9. Pulse amplifiers 36 and 37 are controlled current devices operating to maintain the amplitude of the output pulses therefrom constant and equal in amplitude regardless of the polarity and to provide a common base line, such as ground, so that the only variable is the pulse width which will be integrated by integrator 2 to produce the control signal for the VCO of generator 6.

In a condition where the local bit clock leads the received PCM signal the circuitry to provide the output from NAND 13 operates the same as described hereinabove and provides the output signal as illustrated in curve H, FIG. 10. When the local bit clock of curve I, FIG. 10 is phase displaced as illustrated with respect to the center of the bit period of the received PCM signal, the circuitry including NAND 16, delay device 17 and NOT 18 will produce the output from NAND 16 as illustrated in curves K, FIG. 10. Bistable device 19, NAND 15, NOT-circuits 24, 26 and 27, monostable multivibrator 8 and delay device 25 and operate as described hereinabove except that the 1 to 0 transitions of curves M and N of FIG. 10 occur sooner relative to the time of occurrence of the corresponding transitions in FIG. 9, but with the resultant desired, namely, inhibiting of the pulses of the output signal from NAND 13 as illustrated in curve H, FIG. 10 which occur within one bit period of a preceding sampled transition. Also, due to the time shift of the bit clock (curve K, FIG. 10) applied to bistable device 7 the duration of the positive and negative outputs from bistable device 7 (curve Q, FIG. 10) will be changed as illustrated resulting eventually in the output to integrator 2 as illustrated in curve T, FIG. 10 wherein the negative pulse has a greater area than the positive pulse resulting in a negative control signal which will shift the VCO of generator 6 in the proper direction to achieve the desired synchronization.

When the bit clock lags the received PCM signal, the phase comparator operates as illustrated in the timing diagram of FIG. 11 and results in an output to integrator 2 as illustrated in curve T, FIG. 11 wherein the positive pulse has a greater area than the negative pulse resulting in a control signal from integrator 2 which is positive to control the VCO of generator 6 in the proper direction to produce the desired synchronization.

While I have described above the principles of my invention in connection with specific apparatus, it is to be clearly understood that this description is made only by way of example.

I claim:

1. A system to generate an output signal indicative of the phase relationship of a first pulse signal and a second pulse signal, each pulse of said first pulse signal having a width equal to an integral multiple of a predetermined width, wherein said integral includes one, and each pulse of said second pulse signal having a width less than one-half said predetermined width and a repetition period equal to said predetermined width, comprising:

- a first source of said first pulse signal, said first signal is a binary intelligence signal having a bit period equal to said predetermined width;
- first means coupled to said first source to produce a third pulse signal including a pulse having a width less than one-half said predetermined width corresponding to each transition of each of the pulses of said first pulse signal;
- a second source of said second pulse signal, said second signal is produced to indicate a given on of the transitions of a local bit clock signal which is to be synchronized with the bits of said binary intelligence signal;
- second means coupled to said first means and said second source to produce a fourth pulse signal having adjacent pulses therein separated by an amount greater than said predetermined width; and
- third means coupled to said second means and said second source to produce said output signal.

2. A system according to claim 1, wherein said second source includes at least

- a third source of pulse signal, each pulse thereof having a width equal to one-half said predetermined width and a repetition period equal to said predetermined width,
- a delay device coupled to said third source,
- a NOT circuit coupled to the output of said delay device, and
- a two input NAND gate having one input coupled to said third source and the other input coupled to the output of said NOT circuit, the output of said NAND gate providing said second pulse signal.

3. A system according to claim 1, wherein said first means includes at least

- a first NOT circuit coupled to said first source,
- a delay device coupled to the output of said first NOT circuit,
- a second NOT circuit coupled to the output of said delay device,
- a first two input NAND gate having one input coupled to said first source and the other input coupled to the output of said delay device,
- a second two input NAND gate having one input coupled to the output of said first NOT circuit and the other input coupled to the output of said second NOT circuit, and
- a third two input NAND gate having one input coupled to the output of said first NAND gate and the other input coupled to the output of said second NAND gate, the output of said third NAND gate providing said third pulse signal.

4. A system according to claim 1, wherein said second means includes

- a bistable device having a set input, a reset input and two outputs, said reset input being coupled to said second source,
- a two input NAND gate having one input couplet to the output of said first means and the other input coupled to one of the outputs of said bistable device, the output of said NAND gate providing said fourth pulse signal, and
- a monostable device having its input coupled to the output of said NAND gate and its output coupled to said set input of said bistable device, the width of the pulse produced by said monostable device being equal to said predetermined width to inhibit pulses of said third pulse signal occurring less than said predetermined width after the immediately preceding pulse of said third pulse signal.

5. A system according to claim 1, wherein said third means includes

- a bistable device having a set input, a reset input and two outputs, said reset input being coupled to said second source and said set input being coupled to the output of said second means, and
- means coupled to one of said outputs of said bistable device to produce said output signal.

6. A system according to claim 1, wherein said second source includes at least a third source of pulse signal, each pulse thereof having a width equal to one-half said predetermined width and a repetition period equal to said predetermined width, a first delay device coupled to said third source, a first NOT circuit coupled to the output of said first delay device, and a first two input NAND gate having one input coupled to said third source and the other input coupled to the output of said first NOT circuit, the output of said first NAND gate providing said second pulse signal;

said first means includes at least a second NOT circuit coupled to said first source, a second delay device coupled to the output of said second NOT circuit, a third NOT circuit coupled to the output of said second delay device, a second two input NAND gate having one input coupled to said first source and the other input coupled to the output of said second delay device, a third two input NAND gate having one input coupled to the output of said second NOT circuit and the other input coupled to the output of said third NOt circuit, and a fourth two input NAND gate having one input coupled to the output of said second NAND gate and the other input coupled to the output of said third NAND gate, the output of said fourth NAND gate providing said third pulse signal;

said second means includes a first bistable device having a set input, a reset input and two outputs, said reset input being coupled to the output of said first NAND gate, a fifth two input NAND gate having one input coupled to the output of said fourth NAND gate and the other input coupled to one of the outputs of said first bistable device, the output of said fifth NAND gate providing said fourth pulse signal, and a monostable device having its input coupled to the output of said fifth NAND gate and its output coupled to said set input of said first bistable device, the width of the pulse produced by said monostable device being equal to said predetermined width to inhibit pulses of said third pulse signal occurring less than said predetermined width after the immediately preceding pulse of said third pulse signal; and said third means includes a second bistable device having a set input, a reset input and two outputs, said reset input being coupled to the output of said first NAND gate and said set input being coupled to the output of said fifth NAND gate, a fourth NOT circuit coupled to one of the outputs of said second bistable device, a sixth two input NAND gate having one input coupled to said one of the outputs of said second bistable device and the other input coupled to the output of said monostable device, and means coupled to the output of said fourth NOT circuit and the output of said sixth NAND gate to produce said output signal.

* * * * *